United States Patent
Payne

(10) Patent No.: US 7,342,689 B2
(45) Date of Patent: Mar. 11, 2008

(54) METHODS AND APPARATUS FOR CONVERTING FULL COLOR IMAGES TO TWO-COLOR IMAGES FOR PRINTING AT A TWO-COLOR PRINTER

(75) Inventor: Stephen R. Payne, Cortland, NY (US)

(73) Assignee: TransAct Technologies Incorporated, Hamden, CT (US)

( * ) Notice: Subject to any disclaimer, the term of this patent is extended or adjusted under 35 U.S.C. 154(b) by 702 days.

(21) Appl. No.: 10/871,992

(22) Filed: Jun. 18, 2004

(65) Prior Publication Data
US 2005/0099455 A1    May 12, 2005

Related U.S. Application Data

(60) Provisional application No. 60/519,521, filed on Nov. 12, 2003.

(51) Int. Cl.
G06K 15/00 (2006.01)
H04N 1/405 (2006.01)
B41J 2/21 (2006.01)

(52) U.S. Cl. .......................... 358/3.13; 358/1.9; 347/43

(58) Field of Classification Search ................. 358/1.1, 358/1.8, 1.9, 3.13, 502, 503, 518, 535; 347/1, 347/24, 43, 110, 115
See application file for complete search history.

(56) References Cited

U.S. PATENT DOCUMENTS

| | | | | |
|---|---|---|---|---|
| 4,903,048 A | * | 2/1990 | Harrington | 347/115 |
| 5,719,689 A | * | 2/1998 | Terada | 358/529 |
| 5,812,169 A | * | 9/1998 | Tai et al. | 347/110 |
| 6,206,504 B1 | | 3/2001 | Payne | |
| 6,502,923 B2 | | 1/2003 | Payne | |
| 6,523,937 B1 | | 2/2003 | Payne | |
| 6,934,054 B1 | * | 8/2005 | Hilsdorf et al. | 358/1.9 |
| 2003/0184774 A1 | * | 10/2003 | Minowa | 358/1.9 |

* cited by examiner

Primary Examiner—Thomas D. Lee
(74) Attorney, Agent, or Firm—Lipsitz & McAllister, LLC

(57) ABSTRACT

Methods and apparatus are provided for converting a full color image to a two-color image for printing at a two-color printer capable of printing black pixels and alternate color pixels. Black pixels and alternate color pixels of the full color image will be printed as corresponding black and alternate color pixels in the two-color image. Printing in pixel areas of the two-color image which correspond to white pixels of the full color image will be inhibited, such that the white pixels of the full color image appear as corresponding background colored pixel areas of the substrate in the two-color image. A dithering algorithm is used for converting other color pixels of the full color image into the two-color image by utilizing either a combination of corresponding background colored pixel areas of the substrate and printed alternate color pixels or a combination of corresponding printed black and alternate color pixels.

16 Claims, 3 Drawing Sheets

METHODS AND APPARATUS FOR CONVERTING FULL COLOR IMAGES TO TWO-COLOR IMAGES FOR PRINTING AT A TWO-COLOR PRINTER

This application claims the benefit of U.S. provisional patent application No. 60/519,521 filed on Nov. 12, 2003, entitled "Smart Printer Including Configurable Ticket Template, Status Updating, Color Conversion, Print Progress Detection, Print Completion Detection, and Paper Low Sensing Features," which is incorporated herein and made a part hereof by reference.

BACKGROUND OF THE INVENTION

The present invention relates generally to the field of printing. More specifically, the present invention provides methods and apparatus for converting full color images into two-color images for printing at a two-color printer, for example a two-color thermal printer.

Full color to two-color conversion exists for POS (Point Of Sale) ink-jet and thermal printers as described in commonly assigned U.S. Pat. No. 6,206,504, commonly assigned U.S. Pat. No. 6,502,923, commonly assigned U.S. Pat. No. 6,523,937, and commonly assigned co-pending U.S. patent application Ser. No. 09/633,003. In a prior art color conversion process for inkjet printing, the color intensity of a pixel in the full color image is compared to a single threshold and a decision is made to print a dot (pixel) or not to print a dot (pixel) in order to create the two-color image.

The present invention provides an enhanced algorithm for the conversion of a full color image to a two-color image in connection with high quality printing technologies. The present invention is particularly suited to a two color thermal printer having a primary color (e.g., black) and an alternate color (e.g., red).

SUMMARY OF THE INVENTION

The present invention provides methods and apparatus for converting a full color image to a two-color image for printing at a two-color printer. The apparatus includes means for printing black pixels and pixels of an alternate color on a substrate having a background color. A processor is adapted to determine whether pixels in the full color image are black pixels, white pixels, alternate color pixels, or other color pixels. The processor may be located in the printer itself, or in a host device (e.g., a computer, a cash register, or the like) associated with the printer. The printer may be a point-of-sale (POS) two-color thermal printer. Alternatively, the printer may be a POS two-color ink jet printer.

Black pixels of the full color image will be printed as corresponding black pixels in the two-color image. Alternate color pixels of the full color image will be printed as corresponding alternate color pixels in the two-color image. Printing in pixel areas of the two-color image which correspond to white pixels of the full color image will be inhibited, such that the white color pixels of the full color image appear as corresponding background colored pixel areas of the substrate in the two-color image.

The processor may employ a dithering algorithm for converting other color pixels of the full color image into the two-color image by one of: (a) utilizing a combination of corresponding background colored pixel areas of the substrate and printed alternate color pixels in the two-color image; or (b) utilizing a combination of corresponding printed black and printed alternate color pixels in the two color image.

The processor may also determine the intensity of pixels of the full color image which are not black or white pixels. If the intensity of any alternate color pixels are below a certain threshold, the alternate color pixels below the threshold are treated as other color pixels in the dithering algorithm.

The dithering algorithm will utilize the combination of corresponding background colored pixel areas of the substrate and printed alternate color pixels when the intensity of the other color pixels is below a certain threshold. The dithering algorithm will utilize the combination of corresponding printed black and printed alternate color pixels when the intensity of the other color pixel is above a certain threshold.

In one example embodiment of the present invention, the dithering algorithm may be employed where two or more adjacent pixels in the full color image are other color pixels. In such an embodiment, non-adjacent other-colored pixels of the full color image appear as corresponding background colored pixel areas of the substrate in the two-color image. In other words, non-adjacent other colored pixels will not be included in the dithering algorithm and printing will be inhibited in these pixel areas of the two-color image so that these areas appear as the background color of the substrate in the two-color image.

The present invention also includes methods for converting a full color image to a two-color image for two-color printing which correspond to the foregoing apparatus.

BRIEF DESCRIPTION OF THE DRAWINGS

The present invention will hereinafter be described in conjunction with the appended drawings figures, wherein like numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an example embodiment of the invention. It should be understood that various changes may be made in the function and arrangement of elements without departing from the spirit and scope of the invention as set forth in the appended claims.

Figure 1:
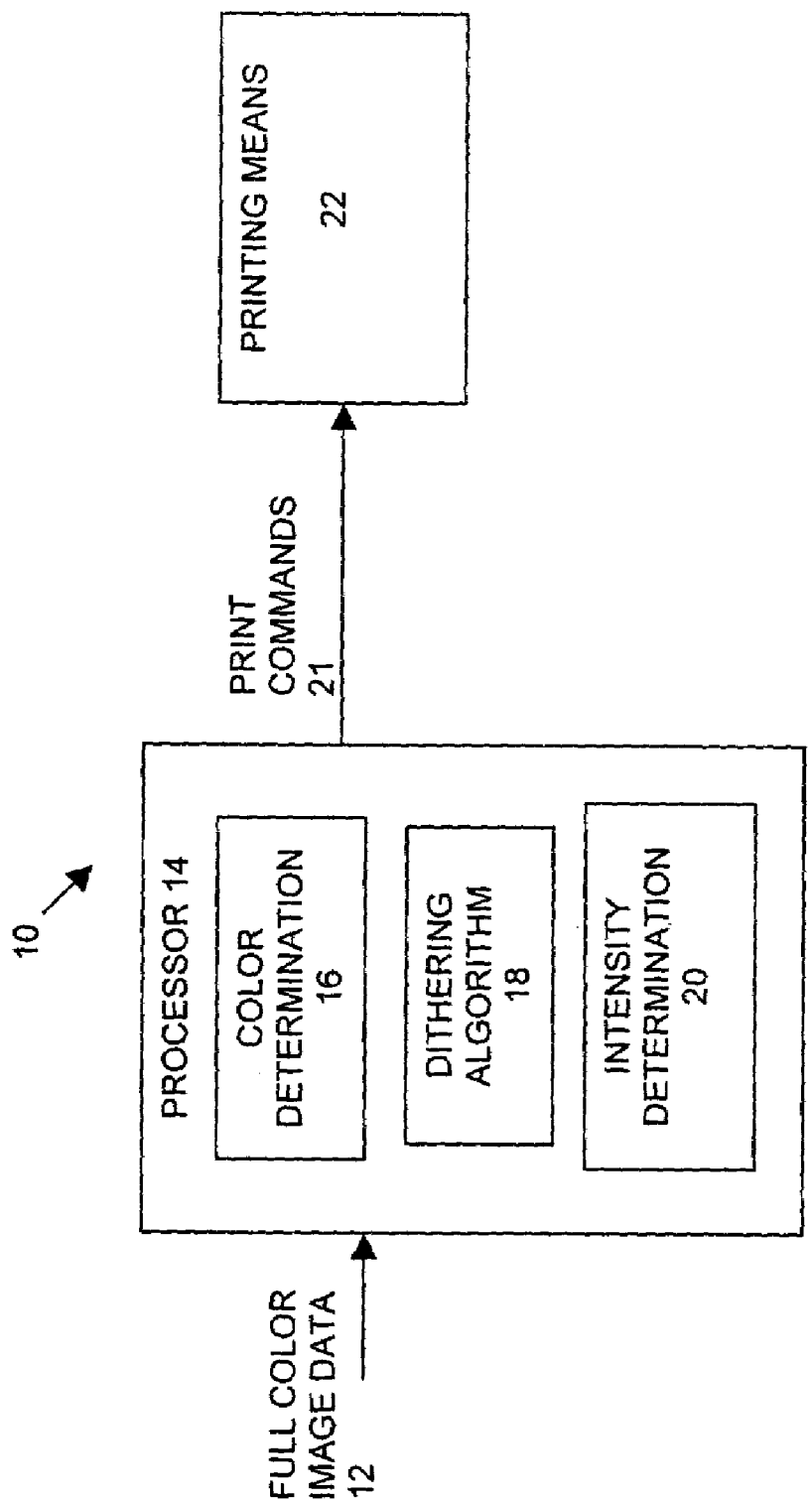
FIG. 1 is block diagram of an example embodiment of the present invention.

The present invention relates to methods and apparatus for converting a full color image to a two-color image for printing by a two-color printer. In an example embodiment of the present invention as shown in FIG. 1, an apparatus 10 for converting a full color image (represented by full color image data 12) to a two-color image includes means 22 for printing black pixels and pixels of an alternate color on a substrate having a background color. A processor 14 is adapted to determine whether pixels in the full color image are black pixels, white pixels, alternate color pixels, or other color pixels (color determination function 16).

The printer may be a point-of-sale (POS) two-color thermal printer. Although the present invention is particularly suited to a thermal printing application due to the higher print quality provided by thermal printers, those skilled in the art will appreciate that the application of the present invention is not limited to thermal printers. For example, the present invention may also be used in connection with converting a full color image to a two-color image for printing on a two-color ink jet printer.

The structure and arrangement of the printing means 22 is not material to the present invention. The printing means 22 may comprise any type of thermal or ink jet printing means now known in the art or to be developed.

Black pixels of the full color image will be printed as corresponding black pixels in the two-color image. Alternate color pixels of the full color image will be printed as corresponding alternate color pixels in the two-color image. Printing in pixel areas of the two-color image which correspond to white pixels of the full color image will be inhibited. In other words, data will not be printed in these areas of the two-color image, such that the white color pixels of the full color image appear as corresponding background colored pixel areas of the substrate in the two-color image. For example, if the two-color image is to be printed on a white substrate, such as a white receipt or ticket, white color pixels of the full color image will appear as white (background) color of the substrate.

The processor 14 may employ a dithering algorithm 18 for converting other color pixels of the full color image into the two-color image by one of: (a) utilizing a combination of corresponding background colored pixel areas of the substrate and printed alternate color pixels in the two-color image; or (b) utilizing a combination of corresponding printed black and printed alternate color pixels in the two color image.

The processor 14 may also determine the intensity of pixels of the full color image which are not black or white pixels (intensity determination function 20). If the intensity of any alternate color pixels are below a certain threshold, the alternate color pixels below the threshold are treated as other color pixels in the dithering algorithm.

The dithering algorithm 18 will utilize the combination of corresponding background colored pixel areas of the substrate and printed alternate color pixels when the intensity of the other color pixels is below a certain threshold. The dithering algorithm 18 will utilize the combination of corresponding printed black and printed alternate color pixels when the intensity of the other color pixels is above a certain threshold. This process is summarized in the table below (Table 1).

TABLE 1

Dithering Algorithm for Full Color to Two-Color Conversion.

| Full Color Image | Two-Color Image |
| --- | --- |
| Black Pixel | Black Pixel |
| White Pixel | Background Color of Substrate (No print) |
| Alternate Color Pixel (High Intensity) | Alternate Color Pixel |
| Other Color or Alternate Color Pixel (low intensity) | Dither Alternate Color and Background (No print) |
| Other Color Pixel (high intensity) | Dither Alternate Color and Black Pixels |

Based on the color determination 16, the intensity determination 20, and the dithering algorithm 18 at the processor 14, the processor 14 will send corresponding print commands 21 to the printing means 22. The printing means will then print either a black pixel, an alternate color pixel, or no data in accordance with the print commands 21.

In one example embodiment of the present invention, the dithering algorithm 16 may be employed by the processor 14 where two or more adjacent pixels in the full color image are other color pixels. In such an embodiment, non-adjacent other-colored pixels of the full color image appear as corresponding background colored pixel areas of the substrate in the two-color image. In other words, non-adjacent other colored pixels will not be included in the dithering algorithm and printing will be inhibited in these pixel areas of the two-color image so that these areas appear as the background color of the substrate in the two-color image.

Figure 2:
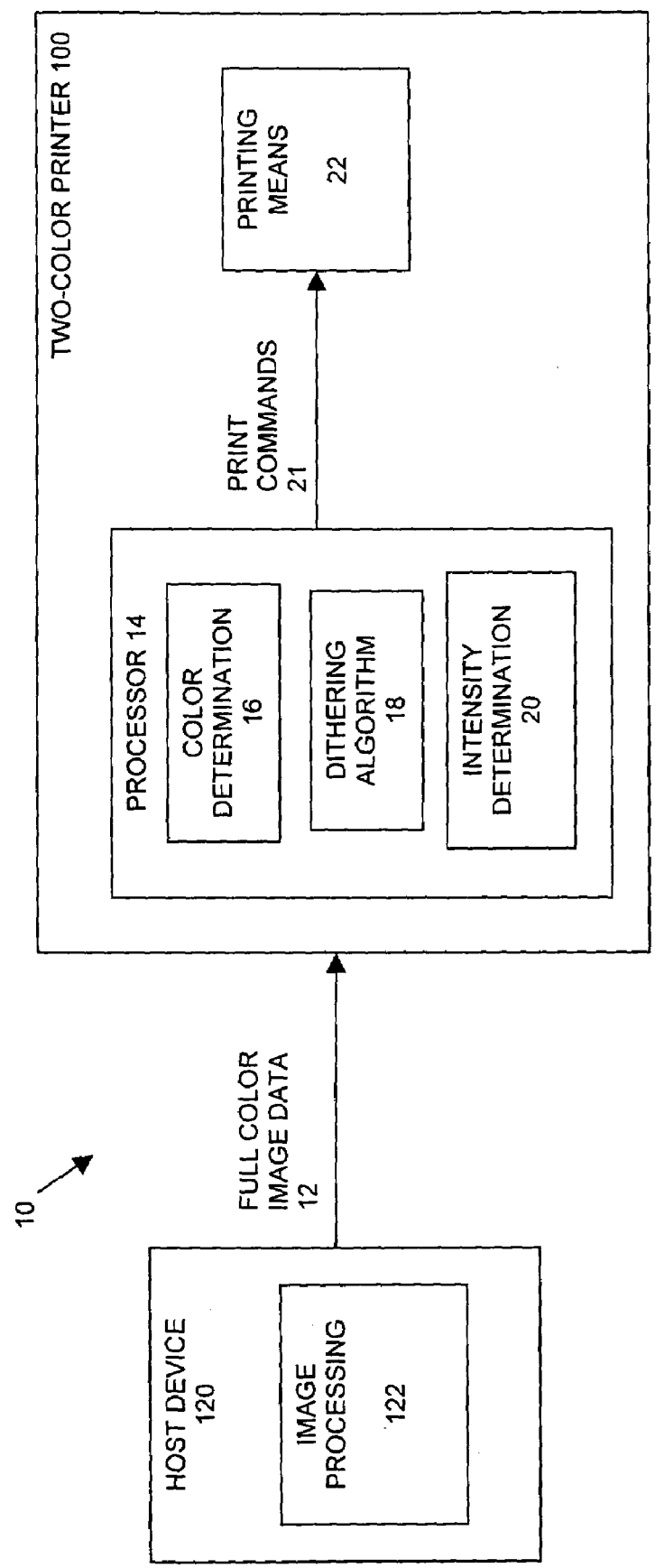
FIG. 2 is a block diagram of an example embodiment of the present invention in which the processing functions are included in the two-color printer.

In an example embodiment of the present invention as shown in FIG. 2, the processor 14 may be located within the printer 100. The processor 14 will function as described above in connection with FIG. 1 and send the print commands 21 to the printing means 22. A host device 120 will provide the processor 14 of the two-color printer with the full color image data 12. The full color image data may be obtained from the full color image via an image processing function 122 at the host device 120. The host device 120 may comprise a computer, a cash register, or the like.

Figure 3:
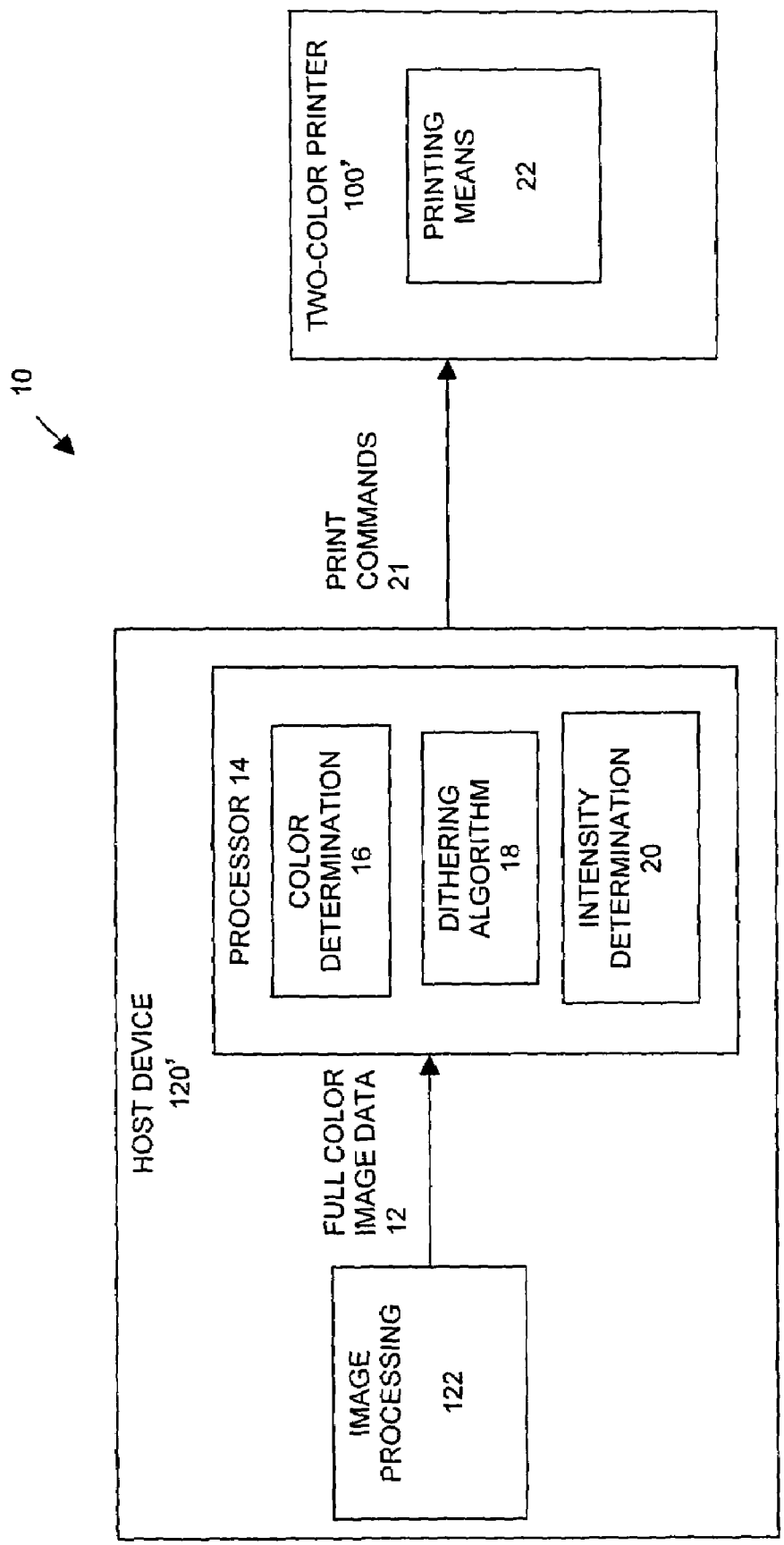
FIG. 3 is a block diagram of a further example embodiment of the present invention in which the processing functions are included in a host device associated with the two-color printer.

In an alternate embodiment of the invention as shown in FIG. 3, the processor 14 may be part of a host device 120' associated with the two-color printer 100'. In such an embodiment, the print commands will be sent from the host device 120' to the two-color printer 100'.

It should now be appreciated that the present invention provides advantageous methods and apparatus for converting a full color image into a two-color image for printing by a two-color printer.

Although the invention has been described in connection with various illustrated embodiments, numerous modifications and adaptations may be made thereto without departing from the spirit and scope of the invention as set forth in the claims.

What is claimed is:

1. A method for converting a full color image to a two-color image in a two-color printer, comprising:

providing means for printing black pixels and pixels of an alternate color on a substrate having a background color;

determining whether pixels in the full color image are black pixels, white pixels, alternate color pixels, or other color pixels;

determining the intensity of pixels of the full color image which are not black or white pixels;

printing black pixels of the full color image as corresponding black pixels in the two-color image;

printing alternate color pixels of the full color image as corresponding alternate color pixels in the two-color image;

inhibiting printing in pixel areas of the two-color image which correspond to white pixels of the full color image such that the white color pixels of the full color image appear as corresponding background colored pixel areas of the substrate in the two-color image;

employing a dithering algorithm for converting other color pixels of the full color image into said two-color image by one of: (a) utilizing a combination of corresponding background colored pixel areas of the substrate and printed alternate color pixels in the two-color image; or (b) utilizing a combination of corresponding printed black and printed alternate color pixels in the two color image;

wherein the combination of corresponding background colored pixel areas of the substrate and printed alternate color pixels is utilized when the intensity of said other color pixels is below a certain threshold.

2. A method in accordance with claim 1, wherein:
the two-color printer comprises one of a two-color thermal printer or a two-color ink jet printer.

3. A method for converting a full color image to a two-color image in a two-color printer, comprising:
providing means for printing black pixels and pixels of an alternate color on a substrate having a background color;
determining whether pixels in the full color image are black pixels, white pixels, alternate color pixels, or other color pixels;
determining the intensity of pixels of the full color image which are not black or white pixels;
printing black pixels of the full color image as corresponding black pixels in the two-color image;
printing alternate color pixels of the full color image as corresponding alternate color pixels in the two-color image;
inhibiting printing in pixel areas of the two-color image which correspond to white pixels of the full color image such that the white color pixels of the full color image appear as corresponding background colored pixel areas of the substrate in the two-color image;
employing a dithering algorithm for converting other color pixels of the full color image into said two-color image by one of: (a) utilizing a combination of corresponding background colored pixel areas of the substrate and printed alternate color pixels in the two-color image: or (b) utilizing a combination of corresponding printed black and printed alternate color pixels in the two color image;
wherein the combination of corresponding printed black and printed alternate color pixels is utilized when the intensity of said other color pixels is above a certain threshold.

4. A method in accordance with claim 3, wherein:
the combination of corresponding background colored pixel areas of the substrate and printed alternate color pixels is utilized when the intensity of said other color pixels is below a certain threshold.

5. A method for converting a full color image to a two-color image in a two-color printer, comprising:
providing means for printing black pixels and pixels of an alternate color on a substrate having a background color;
determining whether pixels in the full color image are black pixels, white pixels, alternate color pixels, or other color pixels;
printing black pixels of the full color image as corresponding black pixels in the two-color image;
printing alternate color pixels of the full color image as corresponding alternate color pixels in the two-color image;
inhibiting printing in pixel areas of the two-color image which correspond to white pixels of the full color image such that the white color pixels of the full color image appear as corresponding background colored pixel areas of the substrate in the two-color image;
employing a dithering algorithm for converting other color pixels of the full color image into said two-color image by one of: (a) utilizing a combination of corresponding background colored pixel areas of the substrate and printed alternate color pixels in the two-color image; or (b) utilizing a combination of corresponding printed black and printed alternate color pixels in the two color image;
wherein said dithering algorithm is employed where two or more adjacent pixels in said full color image are other color pixels.

6. A method in accordance with claim 5, further comprising:
determining the intensity of pixels of the full color image which are not black or white pixels.

7. A method in accordance with claim 6, wherein:
if the intensity of any alternate color pixels are below a certain threshold, said alternate color pixels below the threshold are treated as other color pixels in said dithering algorithm.

8. A method in accordance with claim 5, wherein:
non-adjacent other-colored pixels of the full color image appear as corresponding background colored pixel areas of the substrate in the two-color image.

9. Apparatus for converting a full color image to a two-color image in a two-color printer, comprising:
means for printing black pixels and pixels of an alternate color on a substrate having a background color;
a processor adapted to determine whether pixels in the full color image are black pixels, white pixels, alternate color pixels, or other color pixels;
wherein:
the processor determines the intensity of pixels of the full color image which are not black or white pixels;
black pixels of the full color image are printed as corresponding black pixels in the two-color image;
alternate color pixels of the full color image are printed as corresponding alternate color pixels in the two-color image;
printing in pixel areas of the two-color image which correspond to white pixels of the full color image is inhibited such that the white color pixels of the full color image appear as corresponding background colored pixel areas of the substrate in the two-color image;
said processor employs a dithering algorithm for converting other color pixels of the full color image into said two-color image by one of: (a) utilizing a combination of corresponding background colored pixel areas of the substrate and printed alternate color pixels in the two-color image; or (b) utilizing a combination of corresponding printed black and printed alternate color pixels in the two color image;
wherein the combination of corresponding background colored pixel areas of the substrate and printed alternate color pixels is utilized when the intensity of said other color pixels is below a certain threshold.

10. Apparatus in accordance with claim 9, wherein:
said two-color printer comprises one of a two-color thermal printer or a two-color ink jet printer.

11. Apparatus for converting a full color image to a two-color image in a two-color printer, comprising:
means for printing black pixels and pixels of an alternate color on a substrate having a background color;
a processor adapted to determine whether pixels in the full color image are black pixels, white pixels, alternate color pixels, or other color pixels;
wherein:
the processor determines the intensity of pixels of the full color image which are not black or white pixels;
black pixels of the full color image are printed as corresponding black pixels in the two-color image;

alternate color pixels of the full color image are printed as corresponding alternate color pixels in the two-color image;

printing in pixel areas of the two-color image which correspond to white pixels of the full color image is inhibited such that the white color pixels of the full color image appear as corresponding background colored pixel areas of the substrate in the two-color image;

said processor employs a dithering algorithm for converting other color pixels of the full color image into said two-color image by one of: (a) utilizing a combination of corresponding background colored pixel areas of the substrate and printed alternate color pixels in the two-color image; or (b) utilizing a combination of corresponding printed black and printed alternate color pixels in the two color image;

the combination of corresponding printed black and printed alternate color pixels is utilized when the intensity of said other color pixels is above a certain threshold.

12. Apparatus in accordance with claim 11, wherein:

the combination of corresponding background colored pixel areas of the substrate and printed alternate color pixels is utilized when the intensity of said other color pixels is below a certain threshold.

13. Apparatus for converting a full color image to a two-color image in a two-color printer, comprising:

means for printing black pixels and pixels of an alternate color on a substrate having a background color;

a processor adapted to determine whether pixels in the full color image are black pixels, white pixels, alternate color pixels, or other color pixels;

wherein:

black pixels of the full color image are printed as corresponding black pixels in the two-color image;

alternate color pixels of the full color image are printed as corresponding alternate color pixels in the two-color image;

printing in pixel areas of the two-color image which correspond to white pixels of the full color image is inhibited such that the white color pixels of the full color image appear as corresponding background colored pixel areas of the substrate in the two-color image;

said processor employs a dithering algorithm for converting other color pixels of the full color image into said two-color image by one of: (a) utilizing a combination of corresponding background colored pixel areas of the substrate and printed alternate color pixels in the two-color image; or (b) utilizing a combination of corresponding printed black and printed alternate color pixels in the two color image;

said dithering algorithm is employed where two or more adjacent pixels in said full color image are other color pixels.

14. Apparatus in accordance with claim 13, wherein:

the processor determines the intensity of pixels of the full color image which are not black or white pixels.

15. Apparatus in accordance with claim 14, wherein:

if the intensity of any alternate color pixels are below a certain threshold, said alternate color pixels below the threshold are treated as other color pixels in said dithering algorithm.

16. Apparatus in accordance with claim 13, wherein:

non-adjacent other-colored pixels of the full color image appear as corresponding background colored pixel areas of the substrate in the two-color image.

* * * * *